UNITED STATES PATENT OFFICE.

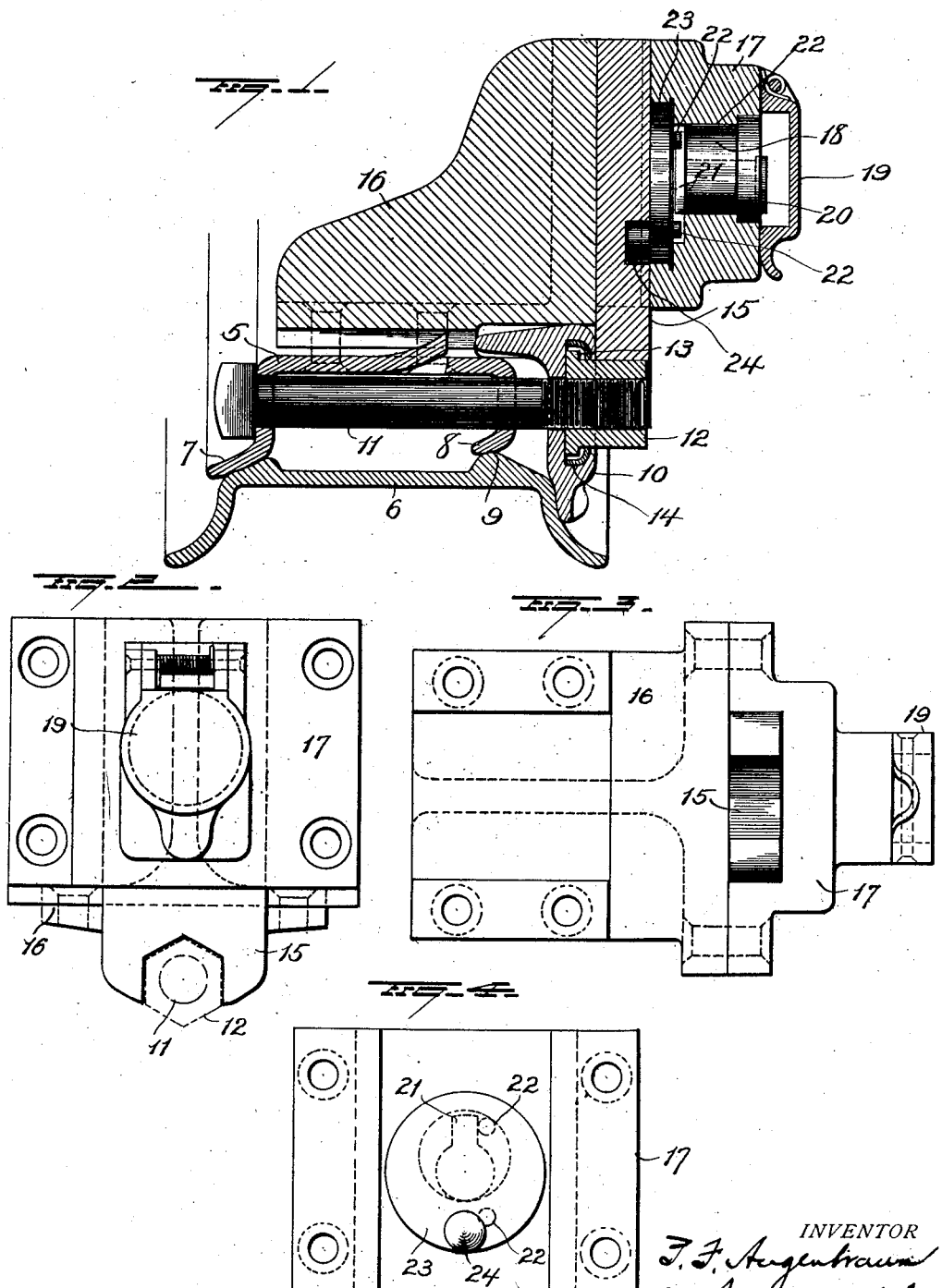

PETER F. AUGENBRAUN, OF STAMFORD, CONNECTICUT, ASSIGNOR TO THE YALE & TOWNE MANUFACTURING COMPANY, OF STAMFORD, CONNECTICUT.

AUTOMOBILE-TIRE LOCK.

1,384,549.   Specification of Letters Patent.   Patented July 12, 1921.

Application filed March 13, 1920. Serial No. 365,519.

*To all whom it may concern:*

Be it known that I, PETER F. AUGENBRAUN, a citizen of the United States, and a resident of Stamford, in the county of Fairfield and State of Connecticut, have invented certain new and useful Improvements in Automobile-Tire Locks; and I do hereby declare the following to be a full, clear, and exact description of the invention, such as will enable others skilled in the art to which it appertains to make and use the same.

My invention relates to an improvement in automobile tire locks, the object being to provide a device that can be applied to any tire carrier or automobile wheel for locking a tire to a spare tire carrier, or to an automobile wheel and it consists in the parts and combination of parts as will be more fully described and pointed out in the claims.

In the accompanying drawings, Figure 1 is a view in transverse section of my improvement applied to a spare tire carrier; Fig. 2 is a view in front elevation of the lock; Fig. 3 is a view in bottom plan of the same, and Fig. 4 is a view in elevation of the bolt actuating mechanism.

While my improvement is designed more particularly for locking a spare tire to a tire carrier, it may be applied to the wheel of an automobile for preventing the theft or unauthorized removal of the rim from the carrier or a wheel, hence while I will hereinafter refer to the part to which the lock is applied as the tire carrier, it will be understood that such term is to include the wheel felly.

5 represents the tire carrier which is circular in form and of a size to receive the rim 6, the tire not being shown on the latter. One edge 7 of the carrier is bent outwardly to engage one side edge of the rim 6 and the other edge of the carrier is constructed to permit the rim to be passed over onto the carrier and be supported thereon by the bent edge 7 of the carrier which overlaps and rests against the rim, and by the bent edge 8 of the carrier engaging the rib 9 on the inner face of the rim, the latter being locked on the carrier by the clamps 10 carried by the carrier and which overlap the other edge of the rim as shown in Fig. 1.

The lock herein shown and described may be applied to all the securing clamps 10 on the carrier, or to only two of them, hence I would have it understood that I do not confine myself to the lock applied to each clamp on the carrier.

The clamp securing bolt 11 passes through the side flanges of the carrier 5 and through the clamp 10 is provided with a head on one end and is threaded at its other or outer end for the nut 12.

I have shown the nut 12 having a peripheral flange 13 housed within a recess 14 in the clamp 10, so that while the nut is free to turn in the clamp it is held against separation from the latter, but it is clearly evident that the nut may bear against the outer face of the clamp and be removable from the bolt indepenedntly of the clamp. The nut is made angular in shape as shown in Fig. 2 and is adapted to be locked against turning movement on the bolt 11 by the lock bolt 15, which latter has a recessed end as shown adapted to receive the nut and absolutely prevent the latter from being turned on the bolt, and is mounted for longitudinal movement in the bracket 16 which is riveted to the inner face of the tire carrier 5 over or in line with the clamp securing bolt 11.

Secured to the outer face of bracket 16 by riveting or other permanent method of attachment, is the lock housing 17 carrying a lock 18, preferably of the pin tumbler cylinder type as shown, the outer end of the lock being normally concealed by the hinged and spring pressed cover 19. The lock housing and bracket constitute the casing for the sliding blot 15.

The key actuated member 20 of the lock is provided at its rear end with a cam 21 adapted when turned to engage one of two pins 22 secured to the outer face of the disk 23 which is mounted to rotate in a circular recess formed in the inner face of the housing 17, and which is provided on its rear face with the wrist pin 24 which rests and moves in a single transverse slot formed in the bolt 15. It will therefore be seen that by turning the movable member of the lock 18 by its key in one direction, the cam 21 thereon will engage one pin 22 on disk 23 and rotate the latter in a direction to move the bolt 15 away from the nut and by rotating the cam in the reverse direction it will engage the other pin 22 and turn the disk in a direction to move the bolt toward the nut.

When the bolt is in locking position as shown in Fig. 1 it overlaps the clamp 10 and embraces the nut, hence if the bolt 11 could be removed by unscrewing it from the nut, the clamp would still be held in place by the overlapping bolt. By retracting the locking bolt 15 the nut will be freed and can be turned in a direction to withdraw and remove the clamp 10, and then by readjusting the clamp and nut on the bolt, the nut can be locked against the possibility of removal, thus absolutely preventing the removal of the rim 6 except by the use of the special key for the lock 18.

The device is simple and readily attached to a spare rim carrier or to a wheel felly and when used operates to absolutely lock the clamp against the possibility of accidental displacement or removal except by the use of the special key for the lock.

It is evident that many slight changes might be made in the relative arrangement of parts shown and described without departing from the spirit and scope of my invention. Hence I would have it understood that I do not wish to confine myself to the exact construction and arrangement of parts shown and described but, Having fully described my invention what I claim as new and desire to secure by Letters-Patent, is:—

1. In an automobile tire lock, the combination of a bolt casing adapted to be secured to a tire carrier, a bolt carried by said casing and adapted to overlap the rim locking clamp and engage and house a clamp locking nut and a key lock carried by said casing for actuating the bolt.

2. In an automobile tire lock, the combination of a bolt casing adapted to be secured to a tire carrier, a bolt mounted for sliding movement in said casing, one end of the bolt being recessed to receive a nut and lock the latter against turning movement, and a key lock carried by the casing for actuating the sliding bolt.

3. In an automobile tire lock, the combination of a carrier, a securing bolt carried by the latter, a tire clamp mounted on the bolt, a nut on the securing bolt for locking the clamp in place, a casing secured to said carrier, a sliding bolt mounted in the casing and recessed to embrace the nut and key lock carried by the casing for actuating the nut locking bolt.

4. In an automobile tire lock, the combination of a carrier, a securing bolt carried by the latter, a tire clamp mounted on said bolt, a nut on the securing bolt for locking the clamp to the carrier, a casing secured to said carrier, a locking bolt mounted in said carrier and adapted to be projected to overlie the clamp for locking the same in place and a key lock for actuating the sliding bolt.

5. In an automobile tire lock, the combination of a carrier, a tire clamp, a nut carried by and mounted to turn in said clamp, a securing bolt carried by the carrier and engaging said nut, a casing secured to the carrier, and a locking bolt mounted in said casing and adapted to be projected to overlie the clamp and recessed at its free end to receive the nut for preventing the latter from turning.

6. In an automobile tire lock, the combination of a carrier, a clamp, a locking bolt and nut for locking the clamp to the carrier, a bracket permanently secured to the carrier, a sliding bolt mounted in said bracket and a key lock for actuating the bolt whereby the latter may be moved to overlie the clamp and engage the nut for preventing the latter from being turned.

7. In an automobile tire lock, the combination of a carrier, a clamp, a nut carried by the clamp but free to be turned, a bolt carried by the carrier and engaged by said nut, a bracket permanently secured to the carrier, a sliding bolt mounted in said bracket and recessed at its free end to receive the nut, and a key lock for actuating the bolt.

8. In an automobile tire lock, the combination of a tire carrier, a tire locking clamp, a nut carried by the latter but free to be turned, a clamp securing bolt carried by the carrier and engaged by said nut and key locking device permanently secured to the carrier and adapted to engage the clamp locking nut for preventing the removal of the latter except by the use of the special key for the lock.

In testimony whereof, I have signed this specification in the presence of two subscribing witnesses.

PETER F. AUGENBRAUN.

Witnesses:
 JULIUS A. WEST,
 CHARLES A. BERRY.